United States Patent
Elbe et al.

(10) Patent No.: US 7,447,880 B2
(45) Date of Patent: Nov. 4, 2008

(54) PROCESSOR WITH INTERNAL MEMORY CONFIGURATION

(75) Inventors: Astrid Elbe, Munich (DE); Norbert Janssen, Munich (DE)

(73) Assignee: Infineon Technologies AG (DE)

( * ) Notice: Subject to any disclaimer, the term of this patent is extended or adjusted under 35 U.S.C. 154(b) by 434 days.

(21) Appl. No.: 10/723,448

(22) Filed: Nov. 25, 2003

(65) Prior Publication Data

US 2004/0148495 A1    Jul. 29, 2004

Related U.S. Application Data

(63) Continuation of application No. PCT/EP02/05031, filed on May 7, 2002.

(30) Foreign Application Priority Data

Jun. 5, 2001    (DE) ............................... 101 27 195

(51) Int. Cl.
  *G06F 9/50*    (2006.01)
  *H04L 9/32*    (2006.01)
(52) U.S. Cl. .................. 712/229; 712/248; 713/193
(58) Field of Classification Search .............. 712/229, 712/248; 713/193
  See application file for complete search history.

(56) References Cited

U.S. PATENT DOCUMENTS

| 4,777,589 | A | * | 10/1988 | Boettner et al. ............. 710/3 |
| 5,659,680 | A | * | 8/1997 | Cunningham et al. ......... 714/25 |
| 5,818,939 | A | * | 10/1998 | Davis ......................... 713/192 |
| 5,887,064 | A | * | 3/1999 | Seysen ........................ 713/172 |
| 5,909,540 | A | * | 6/1999 | Carter et al. .................... 714/4 |
| 5,926,646 | A | | 7/1999 | Pickett et al. |
| 6,026,485 | A | * | 2/2000 | O'Connor et al. ........... 712/226 |
| 6,157,996 | A | | 12/2000 | Christie et al. |
| 6,185,596 | B1 | * | 2/2001 | Hadad et al. ................ 708/491 |
| 6,523,102 | B1 | * | 2/2003 | Dye et al. .................... 711/170 |
| 6,862,641 | B1 | * | 3/2005 | Strongin et al. ............. 710/260 |

FOREIGN PATENT DOCUMENTS

| JP | 07-175768 A | 7/1995 |
| JP | 2000-298589 A | 10/2000 |
| WO | WO-00/79394 A1 | 12/2000 |

* cited by examiner

*Primary Examiner*—Daniel Pan
(74) *Attorney, Agent, or Firm*—Dickstein, Shapiro, LLP.

(57) ABSTRACT

A processor comprises an arithmetic unit for processing operands, a register memory for storing operands with a register memory space and a register memory configuration unit. The register memory configuration unit is designed to configure the register memory such that memory space in the register memory is assigned to operands, and that memory space in the register memory that is not assigned to operands will be made available for other data than the operands. Thereby, on the one hand the number of operand transfers between an external bus and the arithmetic unit is decreased, since as many operands as possible are stored in the register memory, while on the other hand, when part of the register memory is not needed for storage of operands, this part will not be idle but made available for other data, so that the memory resources of the processors are always utilized optimally.

7 Claims, 2 Drawing Sheets

PROCESSOR WITH INTERNAL MEMORY CONFIGURATION

This application is a Continuation of International Patent Application Serial No. PCT/EP02/05031, filed May 7, 2002, which published in German on Dec. 12, 2002 as WO 02/099630 A1.

BACKGROUND OF THE INVENTION

1. Field of the Invention

The present invention refers to computer architectures and in particular to processor architectures with an arithmetic unit and a register memory.

2. Description of the Prior Art

FIG. 3 shows a known processor architecture at the example of a coprocessor. The coprocessor comprises an arithmetic unit 300, a register memory 310 and a control part 320. The arithmetic unit 300, the register memory 310 for operands for the arithmetic unit as well as the control part 320 are physically disposed on the coprocessor 340. The coprocessor is connected to an external bus 350 via an interconnecting bus 340. An external memory 360, a host CPU (not shown) as well as input/output interfaces (not shown), etc. are also connected to the external bus 350.

The arithmetic unit is connected to the register memory via an internal bus 370. The control part 320 can communicate with the register memory 310 or the arithmetic unit 300, respectively, via control lines 380a, 380b. As it is known, the arithmetic unit (AU) 300 is formed to carry out instructions on operands that are stored in the register memory 310. Therefore, the control part 320 controls the register memory 310 to load operands needed by a special instruction to be carried out by the AU 300 to the AU, so that the instruction can be carried out on the operands. The result of the arithmetic operation is written back into the register memory via the internal bus 370 to be available for a next instruction at the instigation of the control part 320 or to be brought to an external memory via the interconnecting bus 340. Typically, the register memory for a standard processor is designed such that it has a certain number of registers necessary for common calculations to be carried out by the arithmetic unit. If the processor is a general-purpose processor, certain registers of the register memory 310 will be needed according to algorithm to be calculated, while other registers that are not needed by a certain algorithm are unused.

If, however, a higher number of registers than are present in the register memory 310 is needed for a calculation, those operands having no space in the register memory 310 will be stored in external memory 360. If the arithmetic unit 300 needs data for its calculations that are not present in the register memory 310, those operands will have to be loaded from the external memory 360 via the interconnecting bus 340. In contrary to the data traffic on the internal bus 370 that happens very fast due to the configuration of the internal bus and not at least due to the short physical lengths, data traffic between the external memory 360 and the arithmetic unit 300 does need a lot of effort. This effort shows, as has been mentioned, by the longer transfer time of data due to the typically physically much greater length of the external bus and the interconnecting bus 340 as well in the signaling in order to signal an operand transfer from the external memory 360 to the arithmetic unit 300 or an operand transfer from the arithmetic unit 300 back to the external memory 360.

Especially with security relevant applications, i.e. if the coprocessor 340 is a cryptocoprocessor and is for example implemented on a chip card or is part of a security-IC, a security problem exists, when operands have to be loaded from the external memory 360 via the external bus into the arithmetic unit 300 and back. For an attacker it is easier to localize the external bus on the chip and to "tap" it, than finding the internal bus 370 and tap it. One reason for that is the typically regular sizing of the external bus 350 on the chip as well as the significantly greater length of the external bus in comparison to the internal bus 370 of the coprocessor. Especially when the coprocessor itself is implemented as integrated circuit, the physical length of the external bus 370 is very small, so that tapping this bus is almost impossible. This is totally different for an external bus 350, which has to be connected to the coprocessor chip via an I/O interface.

Regarding the sizing of the register memory 310 usually a register memory capacity is used that is not too large, since in algorithms that only need a small number of operands a large part of the register memory 310 would be unused, i.e. idle. Register memory cells are relatively space-intensive, especially if a large number of them has to be placed on a chip. To keep, for example, a cryptocoprocessor small, the number of register cells is kept small to avoid the case that register memory space is constantly unused and idle and still uses up space on the chip. For the purpose of space efficiency of the chip it is therefore deliberately accepted that for algorithms needing more operands than have space in the register memory a high number of operand transfers from the external memory 360 to the coprocessor 330 has to take place.

Especially in a chip card, where the working memory is very small anyway and due to the size limits of the chip card maybe in the range of 2 to 8 kilobyte, the register memory 310 of a peripheral element, as e.g. of a coprocessor 330, a random number generator, a hash module, a module for a symmetrical cryptography (DES, AES) of another peripheral device, is usually chosen to be very small, so that there is enough working memory (XRAM) available for the functionality of the chip card. Further it should be noted that the chip card also has to comprise a read-only memory (ROM) as well as a non-volatile writeable memory (EEPROM, flash, etc.) so that the register memory 310 is usually laid out as small as anyhow possible in order to fulfill the space requirements of the chip on the chip card.

This is however, as has been mentioned, paid for by security compromises and time losses due to the operand transfer between the external memory 360 and the arithmetic unit 300.

SUMMARY OF THE INVENTION

It is the object of the present invention to provide a secure and fast processor as well as a secure and fast computer system.

In accordance with a first object the present invention provides a processor, having an arithmetic unit for processing operands; a register memory for storing operands; and a register memory configuration unit designed to configure the register memory such that memory space in the register memory is assigned to operands and that memory space in the register memory that is not assigned to operands is made available for other data than the operands.

In accordance with a second aspect the present invention provides a computer system, having a host CPU; a peripheral device connected to the host CPU via an external bus having an internal memory; and a memory configuration unit, the memory configuration unit being designed to make space from the internal memory available for the peripheral device as needed, and to make space from the internal memory not being made available to the peripheral device available for other data by access via an external bus.

The present invention is based on the knowledge that an increase of security and time savings as well as demands for a good memory efficiency can be achieved by designing the register memory so large that for the main number of algorithms the processor has to carry out the operands needed therefore can be stored in the register memory, and that the memory space remaining in the register memory is made available for other data than the operands, for example as working memory.

Therefore, according to the present invention, a register memory configuration unit is used, that configures the register memory such that the needed number of operands for an algorithm which the arithmetic unit has to calculate can be stored in the register memory, and that the rest of the register memory is not "idle", in contrary to prior art, but is made available for other data than the operands. The register memory configuration unit is preferably build on an addressing method carrying out memory mapping, so that the free part of the register memory is mapped into the XRAM, although the free part is physically directly present in the register memory for the arithmetic unit of the processor.

In a preferred embodiment of the present invention, the processor is a crypto processor and the arithmetic unit is a long number arithmetic unit for operands of up to a length of 2048 bits, so that considerable register memory has to be made available if, for example, five operands of such a length are needed. In a preferred embodiment, the processor is designed for different cryptographic algorithms, among which can be an algorithm needing less operands or operands witch a much shorter length, respectively. For example, when considering a RSA signature, which optimally needs four registers with a length of 2048 bits for its modular exponentiation, and at the same time considering an elliptical curve cryptographic application (e.g. EC-DSA), where e.g. registers with a length of 190 bits are needed for calculating an electronic signature 11, then, despite the greater number of operands in the elliptical curve cryptography almost one kilobyte of register memory would be idle which is especially problematic when the whole working memory (XRAM) is only between 2 and 8 kilobyte, anyway. Inventively, the unused space in the register memory is mapped into the XRAM by the memory configuration unit, so that the processor can use this memory as working memory, or, when thinking of a chip card as computer system, this memory can also be used by other components of the chip card. On the other hand, due to the present invention, the register memory can now be laid out so large that it can accommodate all operands for the cryptoalgorithm needing the most register memory space for its operands. If an algorithm needing a much lesser number of register memories is carried out, the register memory that is not needed can simply be made available as working memory and is not idle.

For the case that the inventive processor is designed as cryptocoprocessor in the shape of a peripheral element on a chip card, in a preferred embodiment of the present invention the register memory configuration unit can be designed such that the whole register memory of the cryptocoprocessors is made available for other peripheral elements of the chip card or for the host CPU as working memory when the arithmetic unit of the cryptocoprocessor is inactive at the moment. Thereby it can be made sure, that always the whole memory of the chip card is in operation or can be made available for applications, regardless whether it is designed as external memory or as register memory, especially in a chip card IC where due to the maximum chip size only very limited memory resources are available.

It should be noted that the internal bus has the full width of the arithmetic unit, while the outer bus has a normal width, as, e.g. 8, 16 or 32 bits. In a long number arithmetic unit the internal bus, however, has, e.g., a width of 1024 bits. Thereby it becomes clear that an operand transfer of a long number operand from memory via an external bus takes several bus cycles and is therefore time- and management-intensive, while this operand can be easily transferred on the internal-broad-bus.

BRIEF DESCRIPTION OF THE DRAWINGS

Preferred embodiments of the present invention will be discussed in more detail below with reference to the accompanying drawings. They show.

DESCRIPTION OF THE PREFERRED EMBODIMENTS

Figure 1:
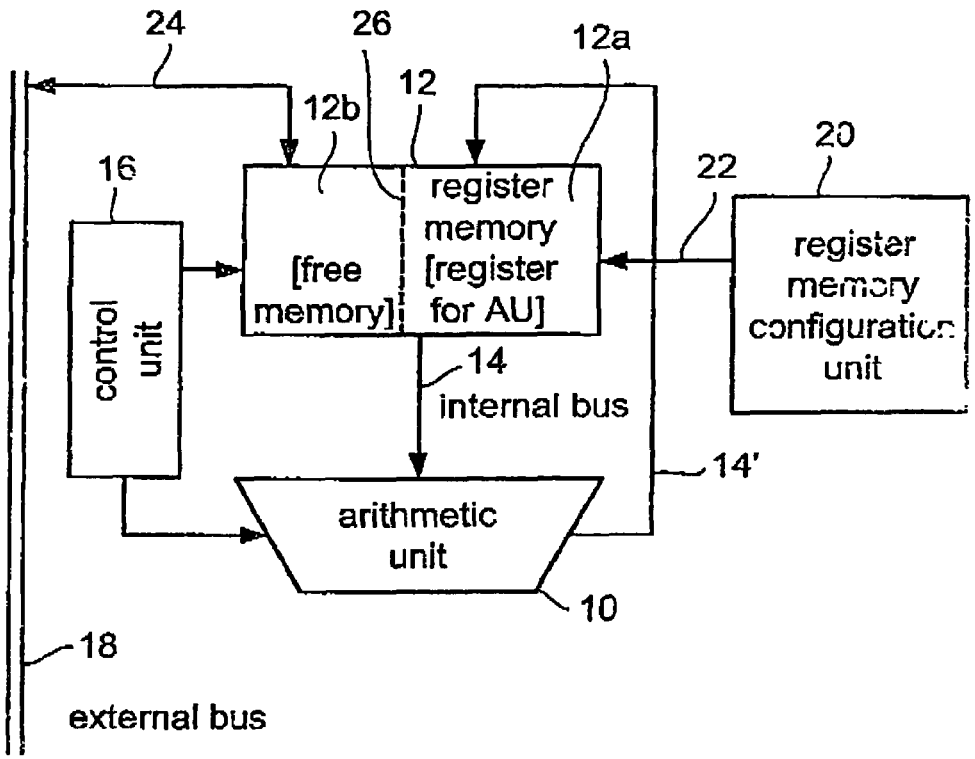
FIG. 1 a block diagram of an inventive processor or an inventive computer system.

FIG. 1 shows an inventive processor. The processor comprises an arithmetic unit 10, a register memory 12, an internal bus 14 between the register memory 12 and the arithmetic unit 10, a further internal bus 14' between the arithmetic unit 10 and the register memory 12 for feeding results of the arithmetic unit back into the register memory 12, a control unit 16 that can control the operation of the arithmetic unit 10 and the operation of the register memory 12 via control lines, an external bus 18 for communication with peripheral devices, e.g. an input/output interface, another processor, etc., and a register memory configuration unit 20. The register memory configuration unit 20 can configure the register memory 12 inventively via a memory configuration line 22.

As shown in FIG. 1, the register memory 12 is configured such that it has a memory portion 12a in which the registers can be configured for the arithmetic unit 10 and that it has another free memory portion 12b to which data can be written to or data can be read from via a register memory bus 24 via the external bus.

Preferably, the register memory 12 is configured so large that for all computing tasks that can be carried out by the arithmetic unit 10 enough registers can be made available for the operands needed by the arithmetic unit 10. If the computing task that has to be managed by the arithmetic unit 10 needs a lot of register memory space, the register memory configuration unit 12 will configure the register memory such that the whole register memory 12 serves for storage of operands for the arithmetic unit 10, similar to a common register memory. In other words, a memory partition limit 26 will be symbolically shifted to the left in FIG. 1, so that the free memory 12b is zero, while the memory for operands for the arithmetic unit 12a fills the whole register memory 12. If the arithmetic unit 10, however, has to manage a computing task where only very view operands and especially, e.g. very short operands are needed, the register memory configuration unit 20 will configure the register memory such that the operand registers are made available by the register memory 12, that, however, the rest of the register memory is configured as free memory 12b into which other data can written. Since the register memory 12 is typically a volatile memory, the free memory space 12b of the register memory 12 is made available for the processor as working memory, e.g. as XRAM. The memory partition limit 26 will then lie somewhere in the middle of the register memory 12 and represent the case depicted in FIG. 1.

If the processor depicted in FIG. 1 is for example designed as coprocessor and connected to a host CPU via the external bus 18, the register memory configuration unit 20 is designed in the preferred embodiment of the present invention such that the memory partition limit 26 regarding to FIG. 1 is shifted all the way to the right, in the case where the arithmetic unit 10 forming part of the coprocessor is not active. This case is possible if only the host CPU is working, but not the coprocessor shown in FIG. 1. Then the register memory 12 of the coprocessor will be made fully available for the host CPU of the processor system. Since the arithmetic unit 10 is not active at the moment, it does not need any operand registers in the register memory. Contrary to the prior art, where the register memory 12 is always idle when the arithmetic unit 10 is not active, the register memory 12 is inventively made available to a host CPU not shown in FIG. 1 due to the actions of the register memory configuration unit 20.

This measure is especially advantageous in processor systems with very limited memory resources, as they can be found on a chip card or on a security IC, for example. Taking the example of a chip card having, apart from a host CPU, a cryptocoprocessor as well as other peripheral devices, as well as a non-volatile memory (E2PROM), a volatile working memory (e.g. XRAM) or a read-only memory (ROM), it can be seen that by making available free parts of the register memory, or, if needed, making available the whole register memory of the cryptocoprocessor the memory resources can be increased significantly. The whole memory capacity of a chip code can be about 5 kilobyte, while the working memory is between 2 and 3 kilobyte. The cryptocoprocessor typically needs a relatively large register memory, since several long number operands, e.g. 4 long number operands with a length of 2048 bits each are needed for secure RSA calculations. If this additional memory of about one kilobyte is made available, when the cryptocoprocessor is not active, the working memory (XRAM) for the host CPU can be enlarged by ⅓ without having to make available additional memory cells.

On the other hand, the implementation of a large register memory has the advantage that the arithmetic unit can be optimally supplied with operands, wherein the operand transfer only takes place via the internal bus 40 (FIG. 1), without having to supply operands to the arithmetic unit via the external bus, as it is the case in the prior art. However, so that for other algorithms that do not need as much register memory, the register memory that is not needed is not "idle", the register memory configuration unit is inventively provided to configure the register memory into a free register part 12b and a register memory part for the arithmetic unit 12a.

In the following, reference will be made to FIG. 2 in order to illustrate the inventive mapping of free memory space 12b into the XRAM working memory of a processor system, where the arithmetic unit shown in FIG. 1 forms a cryptocoprocessor of a processor system together with a register memory (12a and 12b) and the control unit 16 (controller), for example on a chip card.

Figure 2:
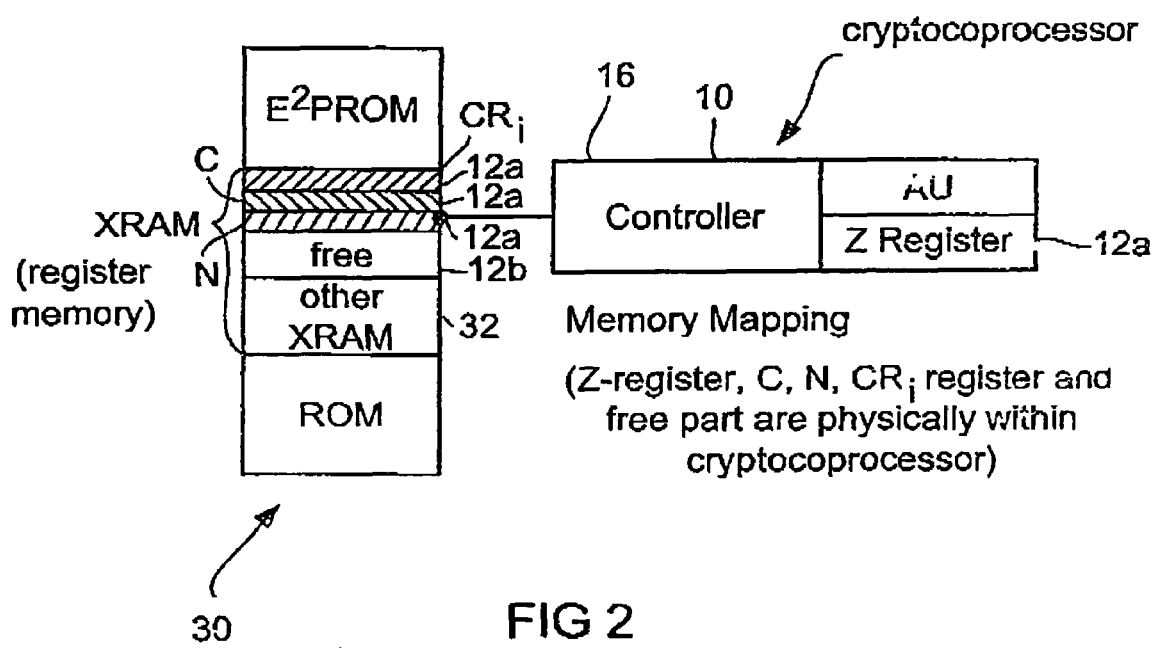
FIG. 2 a symbol representation of the memory situation of a preferred embodiment of the present invention, where part of the register memory of the coprocessor is mapped into the working memory of the computer system.
Figure 3:
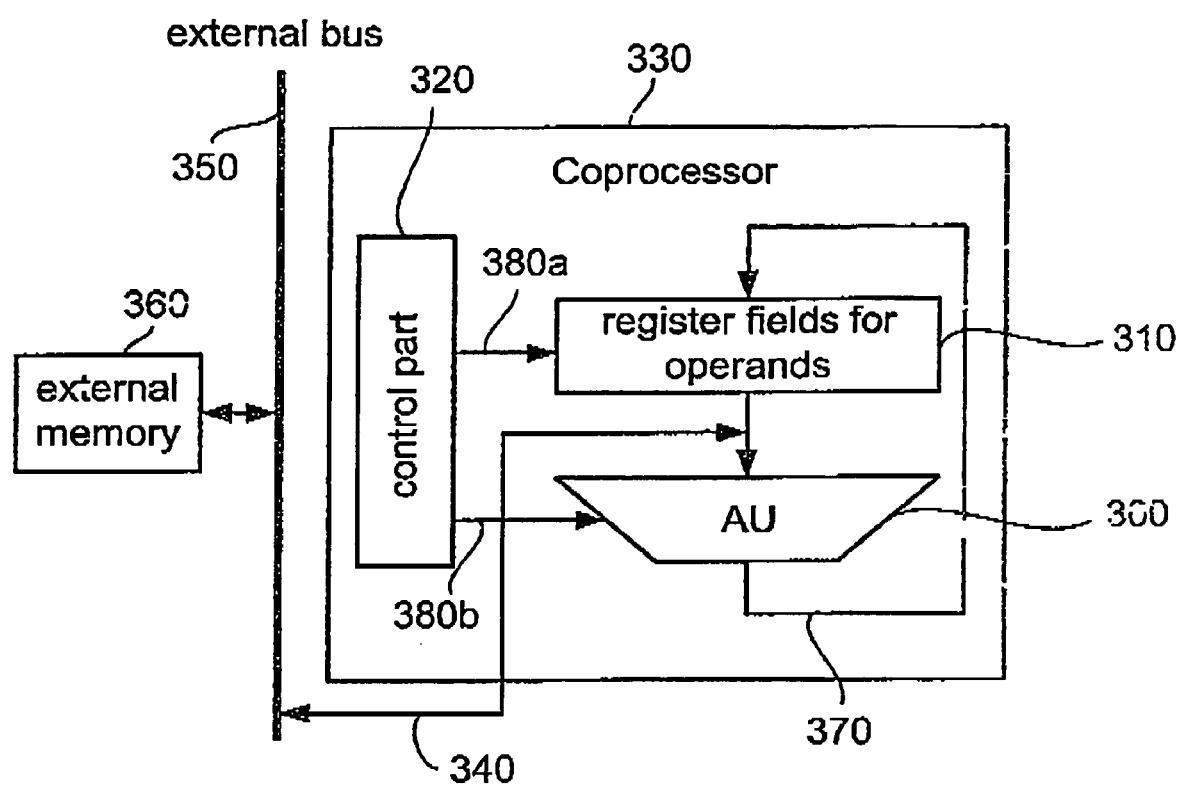
FIG. 3 a known processor architecture.

On the left in FIG. 2 a memory hierarchy 30 is illustrated that forms a non-volatile memory in form of a E2PROM, a read-only memory in form of a ROM, as well as a volatile working memory in form of a XRAM. The working memory XRAM comprises both the register memory 12a and another XRAM working memory 32 laid out at another portion of the chip card. As it is shown in FIG. 2, different registers C, N and CRi are configured in the XRAM working memory, these register memory spaces designated by reference number 12a in FIG. 2 are not part of the other XRAM 32 of the chip card but are physically disposed in the cryptocoprocessor like the memory space for the Z register. The registers Z, N, C and CRi are needed for the calculation of RSA signatures, for example.

In the embodiment shown in FIG. 2 it can be seen that the memory space for the registers C, N and CRi is mapped into the working memory of the chip card while this is not the case for the Z register. If the register memory configuration unit controls the register memory of the cryptocoprocessor that no registers C, N and CRi are needed for the calculation of a certain task, the space of these registers can easily be used by other elements than the arithmetic unit 10 of the cryptocoprocessor, due to the mapping. This is, however, not the case for the Z register of FIG. 2. Regardless whether the Z register is needed or not, it is not available as working memory for the chip card. Therefrom it can be seen that it can also be useful for certain applications, not to map in the whole register memory that is physically existent in the cryptocoprocessor into the working memory of the chip card, but only a certain part.

In the following, certain possible memory configurations or memory needs for different cryptographical algorithms will be addressed. The optimum memory configuration for a cryptographic processor depends on the cryptoalgorithms that are to be calculated on the cryptoprocessor. For example, for a RSA signature the registers C, N, Z and one CRi register are needed, which can, depending on security requirements, have a length between 1.000 to 2.500 bit each. However, it is also possible to speed up the RSA signature calculation by adding further CRi registers. In the added CRi registers pre-calculated values can be stored, that speed up the RSA signature calculation. Inventively, the register memory configuration unit 20 will configure the register memory 12, such that memory space is also assigned to the additional CRi registers, so that the free memory 12b will become smaller in comparison to the case of four registers, that, however, the calculation is enlarged since the operands stored in the CRi registers can be transferred quickly and easily via the internal bus 14 between the register memory 12 and the arithmetic unit 10. The prerequisite is therefore, obviously, that the register memory 12 is laid out sufficiently large. Another example for an optimum register memory configuration is the modular exponentiation by using the square and multiply algorithm. If, for security reasons, identical computing times are chosen for quadrature and multiplication, the operand for the quadrature has to be stored twice, i.e. in register C and in a CRi register. Here, an additional CRi register is needed, that is configured by the register memory configuration unit in the register memory 12.

A large dimensioning of the register memory is, however, uncritical regarding the memory space, since, when the whole amount of memory in the register memory is not needed, the memory is not "idle" like in the prior art, but is made available for other components of the processor system by the memory configuration unit 20 and the interconnecting bus 24 via the external bus.

Further, if there is a need to calculate electronic signatures with the help of elliptic curves (EC-DSA) then, in projective coordinates, additionally to the registers C, N and Z eight further registers, e.g. Cri, are needed for storage of curve parameters.

If, however, the cryptoprocessor is not used, the whole register memory or the main part of the register memory (without the Z register of FIG. 2) will be configured as free memory by the register memory configuration unit, in which other data can also be stored.

The register memory configuration unit 20 is further disposed to configure number and size of the operand registers for the arithmetic unit, depending on the used cryptoalgorithm. The length of the register also differs from cryptoalgorithm to cryptoalgorithm. While in a RSA calculation without Chinese Remainder Theorem (CRT) all registers need to have the full length (for example 1024 or 2048 bit), in a RSA calculation with CRT, registers with only half that length are sufficient, which means registers with a length of 512 or 1024 bits.

In the case of cryptographic calculations based on elliptic curves the registers only need a much shorter length, for example 160 or 190 bits.

The register memory configuration unit 20 is disposed to configure the number and length of registers via instructions of the cryptoprocessor, i.e. the control unit 16. The space that is not needed is available for further applications, which is, as has been discussed, a factor not to be underestimated especially for smart cards, since such smart cards have a volatile memory of only between 2 and 4 kilobyte, so that already one register of the length of 2304 bits that is not used provides the programmer with additional memory space not to be neglected. Apart from using processor instructions, the register memory can alternatively be accomplished by setting bits in the state registers etc. by the unit 20.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A processor, comprising;
a cryptocoprocessor having:
an arithmetic unit for processing operands;
a register memory for storing operands; and a register memory configuration unit designed to configure the register memory such that memory space in the register memory is assigned to operands and that memory space in the register memory that is not assigned to operands is made available for data other than the operands;
a volatile working memory comprising:
an external working memory, the external working memory being physically disposed outside the cryptocoprocessor; and
the register memory space not assigned to operands, the register memory space being physically disposed within the cryptocoprocessor,
wherein at least a part of the register memory space not assigned to operands is mapped into the working memory, and
an address unit operable to address the register memory space not assigned to operands and being physically disposed within the cryptocoprocessor in the same way as the external working memory being physically disposed outside the cryptocoprocessor.

2. The processor according to claim 1, wherein the arithmetic unit, the register memory and a control unit for controlling the arithmetic unit and the register memory for loading operands from the register memory into the arithmetic unit and for carrying out an operation with the operands are designed as integrated circuit on a single chip.

3. The processor according to claim 1, wherein the operands are long number operands comprising a length of more than 150 bits.

4. The processor according to claim 1, wherein the arithmetic unit is adapted to perform at least two algorithms, wherein one algorithm needs a maximum amount of register memory space due to its length and/or number of its used operands, while another algorithm needs a smaller amount of register memory space for its operands,
wherein the register memory is dimensioned such that the register memory space it at least equal to the maximum amount of register memory space needed by an algorithm for its operation.

5. The processor according to claim 1, which is adapted to carry out a cryptographic algorithm.

6. The processor according to claim 1, wherein the arithmetic unit and the register memory are connected via an internal bus,
wherein an external element is connected to the arithmetic unit via an external bus, and
wherein the length of the external bus is greater than the length of the internal bus.

7. The processor according to claim 1, wherein the register memory configuration unit is disposed to configure registers of different number and length in the register memory as needed.

* * * * *